United States Patent
Geyer

(10) Patent No.: US 11,028,758 B2
(45) Date of Patent: Jun. 8, 2021

(54) EXHAUST AFTER-TREATMENT SYSTEM WITH ADJUSTABLE FLOW PATH, AND METHOD FOR OPERATING SUCH AN EXHAUST AFTER-TREATMENT SYSTEM

(71) Applicants: VOLVO TRUCK CORPORATION, Gothenburg (SE); Stephen Geyer, Greencastle, PA (US)

(72) Inventor: Stephen Geyer, Greencastle, PA (US)

(73) Assignee: Volvo Truck Corporation, Gothenburg (SE)

(*) Notice: Subject to any disclaimer, the term of this patent is extended or adjusted under 35 U.S.C. 154(b) by 0 days.

(21) Appl. No.: 16/627,310

(22) PCT Filed: Jul. 24, 2017

(86) PCT No.: PCT/US2017/043542
§ 371 (c)(1),
(2) Date: Dec. 29, 2019

(87) PCT Pub. No.: WO2019/022708
PCT Pub. Date: Jan. 31, 2019

(65) Prior Publication Data
US 2020/0165953 A1    May 28, 2020

(51) Int. Cl.
*F02B 27/04* (2006.01)
*F01N 9/00* (2006.01)
(Continued)

(52) U.S. Cl.
CPC .......... *F01N 9/002* (2013.01); *F01N 3/021* (2013.01); *F01N 3/2066* (2013.01);
(Continued)

(58) Field of Classification Search
CPC .... F01N 13/009; F01N 13/011; F01N 3/2892; B01D 53/9477
(Continued)

(56) References Cited

U.S. PATENT DOCUMENTS 6,871,490 B2 * 3/2005 Liang .................. F01N 3/208
60/286
7,251,929 B2 * 8/2007 Hu ........................ F01N 3/2033
60/285
(Continued)

FOREIGN PATENT DOCUMENTS

CN    101018597 A    8/2007
CN    101802353 A    8/2010
(Continued)

OTHER PUBLICATIONS

International Search Report (dated Oct. 6, 2017) for correponding International App. PCT/US2017/043542.
(Continued)

*Primary Examiner* — Jason D Shanske
(74) *Attorney, Agent, or Firm* — WRB-IP LLP

(57) ABSTRACT

An exhaust after-treatment system includes a first set of exhaust after-treatment components, a second set of exhaust after-treatment components, an inlet to the exhaust after-treatment system, an outlet from the exhaust after-treatment system, and a valve and conduit arrangement configurable in a plurality of modes, in a first mode, exhaust gas entering the inlet flows through the second set of exhaust after-treatment components, then through the first set of exhaust after-treatment components, and then through the outlet. In a second mode, exhaust gas entering the inlet flows through the second set of exhaust after-treatment components without flowing through the first set of exhaust after-treatment components, and then through the outlet in a third mode, exhaust gas entering the inlet flows through the first set of exhaust after-treatment components, then through the second set of exhaust after-treatment components, and then through the outlet.

10 Claims, 1 Drawing Sheet

(51) Int. Cl.
  *F01N 13/00*   (2010.01)
  *F01N 3/021*   (2006.01)
  *F01N 3/20*    (2006.01)
  *F01N 3/28*    (2006.01)
  *F01N 11/00*   (2006.01)

(52) U.S. Cl.
  CPC .......... *F01N 3/2892* (2013.01); *F01N 11/002* (2013.01); *F01N 13/009* (2014.06); *F01N 13/011* (2014.06); *F01N 2900/1602* (2013.01)

(58) Field of Classification Search
  USPC .......................................................... 60/273
  See application file for complete search history.

(56) References Cited

U.S. PATENT DOCUMENTS

| | | | |
|---|---|---|---|
| 7,810,315 B2 | 10/2010 | Yan | |
| 8,800,272 B2* | 8/2014 | Brahma | F01N 3/208 60/295 |
| 2004/0020192 A1 | 2/2004 | Kimura et al. | |
| 2006/0260296 A1* | 11/2006 | Theis | F01N 3/206 60/286 |
| 2007/0125072 A1* | 6/2007 | McCarthy, Jr. | F01N 3/0885 60/286 |
| 2007/0199311 A1 | 8/2007 | Kalish | |
| 2007/0199331 A1 | 8/2007 | Maguire et al. | |
| 2008/0289321 A1 | 11/2008 | Lu et al. | |
| 2010/0077734 A1* | 4/2010 | Shamis | F01N 3/0842 60/286 |
| 2010/0229535 A1 | 9/2010 | Theis | |
| 2010/0236223 A1* | 9/2010 | Ovrebo | F01N 3/0253 60/287 |
| 2011/0192143 A1 | 8/2011 | Andersson et al. | |
| 2012/0023907 A1 | 2/2012 | Brahma et al. | |
| 2014/0109553 A1 | 4/2014 | Roberts, Jr. et al. | |
| 2018/0023450 A1* | 1/2018 | Zhang | F01N 9/00 60/602 |

FOREIGN PATENT DOCUMENTS

| | | |
|---|---|---|
| CN | 102877923 A | 1/2013 |
| DE | 102006054352 A1 | 8/2007 |

OTHER PUBLICATIONS

Chinese Official Action (dated Mar. 9, 2021) for corresponding Chinese App. CN 201780092497.6.

European Official Action (dated Dec. 18, 2020) for corresponding European App. EP17918806.5.

* cited by examiner

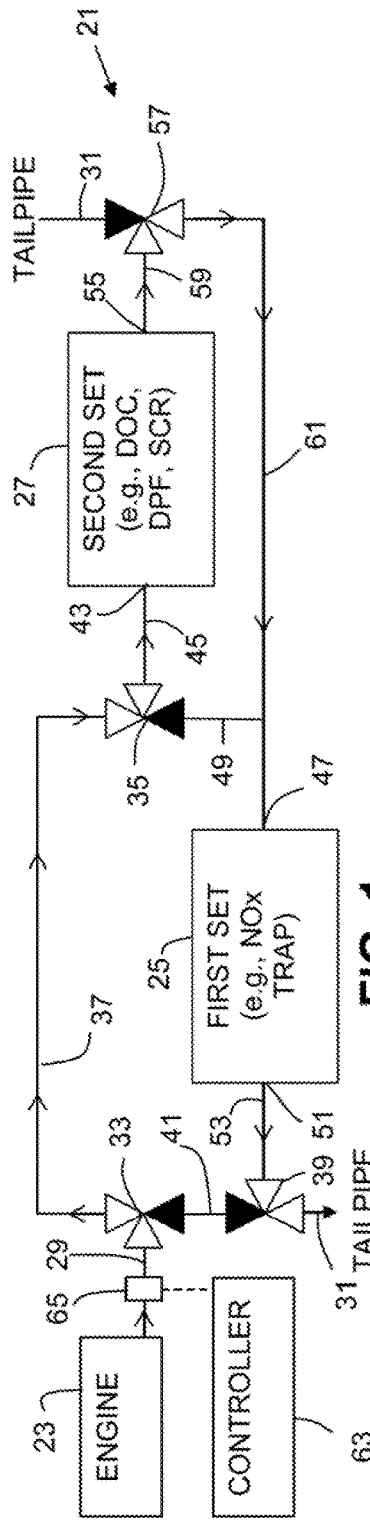
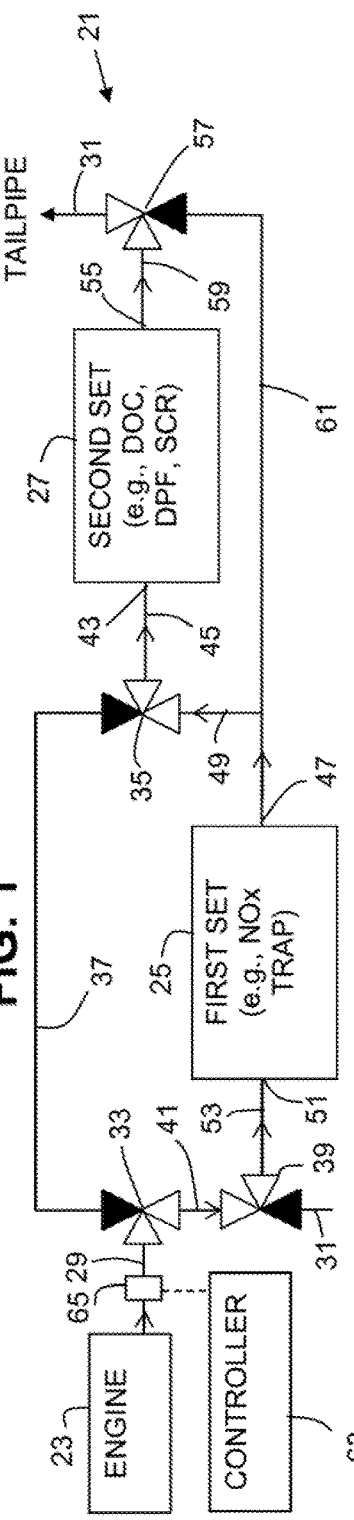
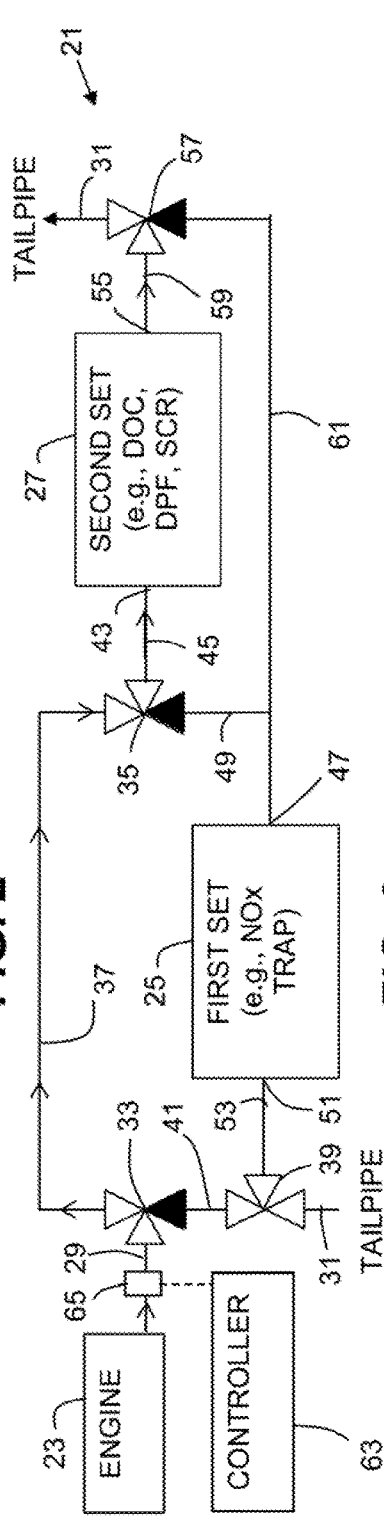

EXHAUST AFTER-TREATMENT SYSTEM WITH ADJUSTABLE FLOW PATH, AND METHOD FOR OPERATING SUCH AN EXHAUST AFTER-TREATMENT SYSTEM

BACKGROUND AND SUMMARY

The present invention relates generally to exhaust after-treatment systems and methods for operating such systems.

Anticipated increased stringency in engine and vehicle emission standards presents a new and unique problem for diesel after-treatment of exhaust gases. Engine emissions during low temperature operation will have to be mitigated better in order to meet the future emission standards. Current exhaust after-treatment systems (EATS) typically need to be at a warm temperature to get reasonable catalytic conversion of emissions. A NOx trap or absorber can be used to store NOx during cold operation. As exhaust temperature heats up, the NOx trap or absorber receives exhaust heat and releases stored NOx, typically to a NOx conversion catalyst, once that NOx conversion catalyst has reached its operating temperature. Current combinations of storage and conversion catalysts are at risk of releasing the NOx stored in NOx traps or absorbers before the conversion catalyst reaches its operating temperature. This allows for the passage of a spike of emissions during the warm up phase when temperatures are in a range in which the storage catalyst(s) releases NOx at but the conversion catalyst(s) are not yet efficiently converting the NOx.

In conventional EATS, storage catalysts are arranged upstream of conversion catalysts because it will be desirable to convert NOx released by the storage catalyst after the conversion catalyst is at its operating temperature. A drawback to this arrangement is that exhaust gases are cooled by, among other things, the storage catalyst before they reach the conversion catalyst, leading to longer warm-up times for the conversion catalyst.

After a storage catalyst stores NOx and the conversion catalyst is at its operating temperature, it is often desirable to regenerate the storage catalyst by passing high temperature exhaust gas through the storage catalyst so that the storage catalyst will release the stored NOx and it can be converted at the conversion catalyst. Extended exposure to higher temperatures can, however, damage the storage catalyst.

It is desirable to provide an EATS that facilitates mitigation of emissions during low temperatures and during high temperatures. It is further desirable to facilitate quickly warming up EATS components that are intended for operation at higher temperatures. It is further desirable to provide an EATS that facilitates regeneration of storage catalysts while minimizing risk of damage to the storage catalysts through extended exposure to high temperatures.

In accordance with an aspect of the present invention, an exhaust after-treatment system, comprises a first set of exhaust after-treatment components, a second set of exhaust after-treatment components, an inlet to the exhaust after-treatment system, an outlet from the exhaust after-treatment system, and a valve and conduit arrangement configurable in a plurality of modes such that, in a first mode, exhaust gas entering the inlet flows through the second set of exhaust after-treatment components, then through the first set of exhaust after-treatment components, and then through the outlet, and, in a second mode, exhaust gas entering the inlet flows through the second set of exhaust after-treatment components without flowing through the first set of exhaust after-treatment components, and then through the outlet.

In accordance with another aspect of the present invention, an exhaust after-treatment system comprises a first set of exhaust after-treatment components, a second set of exhaust after-treatment components, an inlet to the exhaust after-treatment system, an outlet from the exhaust after-treatment system, and a valve and conduit arrangement configurable in a plurality of modes such that, in a first mode, exhaust gas entering the inlet flows through the second set of exhaust after-treatment components, then through the first set of exhaust after-treatment components, and then through the outlet, and, in a second mode, exhaust gas entering the inlet flows through the first set of exhaust after-treatment components, then through the second set of exhaust after-treatment components, and then through the outlet.

In accordance with another aspect of the present invention, a method is provided for operating an exhaust after-treatment system, the exhaust after-treatment system comprising a first set of exhaust after-treatment components, a second set of exhaust after-treatment components, an inlet to the exhaust after-treatment system, an outlet from the exhaust after-treatment system, and a valve and conduit arrangement configurable in a plurality of modes, comprising configuring the valve and conduit arrangement in a first mode such that exhaust gas entering the inlet flows through the second set of exhaust after-treatment components, then through the first set of exhaust after-treatment components, and then through the outlet, and configuring the valve and conduit arrangement in a second mode such that exhaust gas entering the inlet flows through the second set of exhaust after-treatment components without flowing through the first set of exhaust after-treatment components, and then through the outlet.

In accordance with yet another aspect of the present invention, a method is provided for operating an exhaust after-treatment system, the exhaust after-treatment system comprising a first set of exhaust after-treatment components, a second set of exhaust after-treatment components, an inlet to the exhaust after-treatment system, an outlet from the exhaust after-treatment system, and a valve and conduit arrangement configurable in a plurality of modes, comprising configuring the valve and conduit arrangement in a first mode such that exhaust gas entering the inlet flows through the second set of exhaust after-treatment components, then through the first set of exhaust after-treatment components, and then through the outlet, and configuring the valve and conduit arrangement in a second mode such that exhaust gas entering the inlet flows through the first set of exhaust after-treatment components, then through the second set of exhaust after-treatment components, and then through the outlet.

EATS according to aspects of the present invention can facilitate mitigation of emissions during low temperatures and during high temperatures.

EATS according to aspects of the present invention can facilitate quickly warming up EATS components that are intended for operation at higher temperatures.

EATS according to aspects of the present invention can facilitate regeneration of components such as storage catalysts while minimizing risk of damage to such components through extended exposure to high temperatures.

BRIEF DESCRIPTION OF THE DRAWINGS

The features and advantages of the present invention are well understood by reading the following detailed descrip- FIG. 1 is a schematic view of an exhaust after-treatment system according to an aspect of the present invention with a valve and conduit arrangement configured in a first mode;

FIG. 2 is a schematic view of the exhaust after-treatment system of FIG. 1 with the valve and conduit arrangement configured in a third mode;

FIG. 3 is a schematic view of the exhaust after-treatment system of FIG. 1 with the valve and conduit arrangement configured in a second mode.

DETAILED DESCRIPTION

An exhaust after-treatment system 21 (EATS) for an engine 23 is schematically shown in different operating modes in FIGS. 1, 2, and 3. The technology discussed in the present application involves a diesel engine and associated EATS components, however, it will be appreciated that the present invention has application in other engine exhaust after-treatment systems.

The EATS 21 includes a first set of exhaust after-treatment components 25, a second set of exhaust after-treatment components 27, an inlet 29 to the exhaust after-treatment system such as a conduit connected to the exhaust manifold (not shown) of the engine, and an outlet or tailpipe 31 from the exhaust after-treatment system.

The EATS 21 further includes a valve and conduit arrangement configurable in a plurality of modes such that, in a first mode shown in FIG. 1, exhaust gas entering the inlet 29 flows through the second set of exhaust after-treatment components 27, then through the first set of exhaust after-treatment components 25, and then through the outlet 31. The valve and conduit arrangement can be further configurable in a second mode, shown in FIG. 3, wherein exhaust gas entering the inlet flows through the second set of exhaust after-treatment components without flowing through the first set of exhaust after-treatment components, and then through the outlet. The valve and conduit arrangement can still be further configurable in a third mode, shown in FIG. 2, wherein exhaust gas entering the inlet flows through the first set of exhaust after-treatment components, then through the second set of exhaust after-treatment components, and then through the outlet.

The valves and conduits provided in the valve and conduit arrangement may be provided in a number of different ways to be configurable in the first, second, or third modes. In the illustrated embodiments, the valves and conduits are provided so that a first port of a first three-way valve 33 is connected to the engine 23 via the inlet 29, a second port of the first three-way valve is connected to a first port of a second three-way valve 35 via a first conduit 37, and a third port of the first three-way valve is connected to a first port of a third three-way valve 39 via a second conduit 41. The second port of the second three-way valve 35 is connected to a first end 43 of the second set of exhaust after-treatment components 27 via a third conduit 45, and the third port of the second three-way valve is connected to a first end 47 of the first set of exhaust after-treatment components 25 via a fourth conduit 49. The second port of the third three-way valve 39 is connected to a second end 51 of the first set of exhaust after-treatment components via a fifth conduit 53, and the third port of the third three-way valve is connected to the outlet 31. A second end 55 of the second set of exhaust after-treatment components 27 is connected to a first port of a fourth three-way valve 57 via a sixth conduit 59. A second port of the fourth three-way valve 57 is connected to the outlet 31, and a third port of the fourth three-way valve is connected to the first end 47 of the first set of exhaust after-treatment components via a seventh conduit 61 that can also be connected to the fourth conduit 49.

At least one sensor for detecting at least one operating condition is provided. A controller 63 configured to receive a signal from the at least one sensor corresponding to the at least one operating condition is also provided. The controller 63 is configured to automatically configure the valve and conduit arrangement in the first mode when the at least one operating condition is in a first condition, and to configure the valve and conduit arrangement in the second mode when the at least one operating condition is in a second condition. The controller 63 is typically also configured to automatically configure the valve and conduit arrangement in the third mode when the at least one operating condition is in a third condition.

Typically, there are multiple sensors for detecting operating conditions. For example, a temperature sensor 65 can be provided at the inlet 29 to detect a temperature of exhaust gas entering the EATS 21. Other temperature sensors (not shown) can be provided at various locations, such as upstream of a DPF in the second set of exhaust after-treatment components to detect whether temperature is appropriate for regeneration of the DPF. Pressure sensors (not shown) may be provided, as well, such as upstream and downstream of a DPF to detect what the pressure drop across the DPF is to determine whether a regeneration of the DPF is needed.

NOx sensors (not shown) may also be provided, such as to detect whether NOx levels exiting the EATS are in compliance with regulations, or such as to detect whether NOx levels entering and exiting a component such as a NOx trap in the first set of exhaust after-treatment components is performing properly or requires regeneration. Sensors may also comprise timers (not shown) that may trigger operations such as regeneration of a NOx trap or a DPF after a predetermined period of operation. Regeneration of components such as a NOx trap can also be triggered by, for example, calculations of a fully loaded NOx trap obtained by, for example, measuring NOx levels at the inlet 29 and calculating NOx loading based on those measurements, temperature, and exhaust mass flow measurements. Bleed through of NOx can also indicative of a fully loaded NOx trap and can be used to trigger regeneration of components such as a NOx trap by calculating NOx levels using measurements of NOx concentrations taken by a sensor downstream of the NOx trap, temperature, and exhaust mass flow. Various techniques for determining accumulation of NOx or other absorbed emissions are known and are suitable for use in connection with the present invention. When a sensor or the controller 63 makes a determination that a component in the first set of exhaust after-treatment components is fully loaded and requires regeneration, the sensor 65 can send a signal to this effect to the controller 63 and the controller can configure the valve and conduit arrangement as shown in FIG. 2, which results in passing higher temperature exhaust gas through the component so that the component can release the accumulated emissions, which can then be converted by one or more components in the second set of exhaust after-treatment components.

To illustrate operation of the EATS 21, the first set of exhaust after-treatment components 25 might comprise one or more of a NOx trap, a passive NOx absorber, and a hydrocarbon absorber, or other emission retention components, such as components that trap CO or NH3, that ordinarily function optimally at low temperatures, such as temperatures below about 200° C., usually below about 175° C. to 200° C. The second set of exhaust after-treatment components 27 might comprise one or more of a diesel oxidation catalyst, a diesel particulate filter, and a selective catalytic reduction catalyst (SCR), components that ordinarily function optimally at above about 200° C. For example, a current SCR needs a temperature of about 225° C. to start to obtain reasonable conversion efficiencies. During cold operation, i.e., exhaust gas temperature below 200° C. at the inlet 29, which typically follows a cold start of the engine, the exhaust after-treatment components will also be at a temperature below 200° C. As the engine and, accordingly, the exhaust gas, comes to a normal operating temperature, heat in the exhaust gas will transfer to and heat up the exhaust after-treatment components. It is ordinarily desirable to quickly heat up the second set of exhaust after-treatment components so that temperature of gas entering those components is above about 200° C.

When the temperature of the exhaust gas at the inlet 29 is below about 200° C., below the optimal functioning temperature of the second set of exhaust after-treatment components 27 and in the range of optimal functioning temperature of the first set of exhaust after-treatment components 25, the sensor 65 can send a signal to this effect to the controller 63 and the controller can configure the valve and conduit arrangement as shown in FIG. 1, which can be referred to as the normal cold operation. In this first mode, exhaust gas will first enter the second set of exhaust after-treatment components 27 and transfer heat to those components to enable them to heat as quickly as possible, and then the exhaust gas will enter the first set of exhaust after-treatment components 25 so that emissions can be captured by the components in that set. In this way, emissions can be effectively mitigated during cold operation by the first set of exhaust after-treatment components 25 while the second set of exhaust after-treatment components 27 can be more quickly brought to operating temperatures than if the exhaust gas were first passed through the first set of exhaust after-treatment components.

When the temperature of the exhaust gas at the inlet 29 is above about 200° C., in the range of the optimal functioning temperature of the second set of exhaust after-treatment components 27 and above the range of optimal functioning temperature of the first set of exhaust after-treatment components 25, the sensor 65 can send a signal to this effect to the controller 63 and the controller can configure the valve and conduit arrangement as shown in FIG. 3, which can be referred to as the normal hot operation. In this second mode, exhaust gas will enter the second set of exhaust after-treatment components 27 so that emissions can be converted by the components in that set, and the first set of exhaust after-treatment components 25 can be bypassed. Bypassing the first set of exhaust after-treatment components 25 avoids exposing some of the components in that set to high temperatures for extended periods of time, which can damage them. In this way, emissions can be effectively mitigated by the second set of exhaust after-treatment components 27 while the risk of damage to the components of the first set of exhaust after-treatment components 25 due to extended exposure to high temperatures can be minimized.

It is occasionally necessary to regenerate components in the first set of exhaust-aftertreatment components, such as by passing exhaust at higher temperatures, through those components. For example, after a period of time measured by a sensor such as a timer, or after a cold start, components in the first set of exhaust-aftertreatment components 25 such as a NOx trap may be regenerated. If the temperature of the exhaust gas at the inlet 29 is above about 200° C., i.e. above the range of optimal functioning temperature of the first set of exhaust after-treatment components 25 but within the range of temperatures for regeneration of those components, the sensor 65 can send a signal to this effect to the controller 63 and the controller can configure the valve and conduit arrangement as shown in FIG. 2, which can be referred to as regeneration operation. In this third mode, exhaust gas will first enter the first set of exhaust after-treatment components 25 and the sufficiently high temperatures will typically release emissions that had been trapped in those components, which emissions will then enter the second set of exhaust after-treatment components 27 so that the emissions can be converted by the components in that set.

Ordinarily, the valve and conduit arrangement of the EATS 21 will be adapted to be configured in any one of the three modes illustrated in FIGS. 1, 2, and 3, however, if desired or necessary, the valve and conduit arrangement may be configurable on only two of the modes illustrated, such as in the mode illustrated in FIGS. 1 and 2 or the mode illustrated in FIGS. 1 and 3.

In a method for operating an EATS 21 as illustrated in FIG. 1, 2, or 3, the valve and conduit arrangement can be configured in the first, or normal cold operation mode illustrated in FIG. 1 such that exhaust gas entering the inlet 29 flows through the second set of exhaust after-treatment components 27, and then through the first set of exhaust after-treatment components 25, and then through the outlet 31. The valve and conduit arrangement can subsequently be configured in a second, or normal hot operation, mode as shown in FIG. 3 such that exhaust gas entering the inlet 29 flows through the second set of exhaust after-treatment components without flowing through the first set of exhaust after-treatment components 25, and then through the outlet 31. The valve and conduit arrangement can further be configured in a third mode, or regeneration operation, as shown in FIG. 2 wherein exhaust gas entering the inlet 29 flows first through the first set of exhaust after-treatment components 25, then through the second set of exhaust after-treatment components 27, and then through the outlet 31.

The valve and conduit arrangement can be automatically configured by the controller 63 in the first, second, or third modes upon detection, by the at least one sensor 65, of at least one operating condition such as temperature at the inlet 29 or conditions reflecting desirability or necessity of a regeneration of a component in the first set of exhaust after-treatment components 25, and receipt of a signal corresponding to the operating condition by the controller.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

While this invention has been illustrated and described in accordance with a preferred embodiment, it is recognized that variations and changes may be made therein without departing from the invention as set forth in the claims.

What is claimed is:
1. An exhaust after-treatment system, comprising:
a first set of exhaust after-treatment components;

a second set of exhaust after-treatment components, the first set of exhaust after-treatment components comprising different types of exhaust after-treatment components than the second set of exhaust after-treatment components;

an inlet to the exhaust after-treatment system;

an outlet from the exhaust after-treatment system; and a valve and conduit arrangement configurable in a plurality of modes such that
- in a first mode, exhaust gas entering the inlet flows through the second set of exhaust after-treatment components, then through the first set of exhaust after-treatment components, and then through the outlet,
- in a second mode, exhaust gas entering the inlet flows through the second set of exhaust after-treatment components without flowing through the first set of exhaust after-treatment components, and then through the outlet, and
- in a third mode wherein exhaust gas entering the inlet flows through the first set of exhaust after-treatment components, then through the second set of exhaust after-treatment components, and then through the outlet;

at least one sensor for detecting at least one operating condition; and a controller configured to receive a signal from the at least one sensor corresponding to the at least one operating condition, the controller being configured to automatically configure the valve and conduit arrangement in the first mode when the at least one operating condition is in a first condition including that a temperature measured at the inlet is below a predetermined temperature, and to configure the valve and conduit arrangement in the second mode when the at least one operating condition is in a second condition including that the temperature measured at the inlet is above the predetermined temperature.

2. The exhaust after-treatment system as set forth in claim 1, wherein the controller is configured to automatically configure the valve and conduit arrangement in the third mode when the at least one operating condition is in a third condition.

3. The exhaust after-treatment system as set forth in claim 2, wherein at least one component of the first set of exhaust after-treatment components is an emissions absorbing component that absorbs emissions in a first temperature range and releases absorbed emissions in a second temperature range above the first temperature range, and the third condition of the at least one operating condition is a determination that loading of the emissions absorbing component with absorbed emissions is at or above a predetermined level.

4. The exhaust after-treatment system asset forth in claim 1, wherein the first set of exhaust after-treatment components comprises one or more of a NOx trap, a passive NOx absorber, and a hydrocarbon absorber.

5. The exhaust after-treatment system as set forth in claim 4, wherein the second set of exhaust after-treatment components comprises one or more of a diesel oxidation catalyst, a diesel particulate filter, and a selective catalytic reduction catalyst.

6. The exhaust after-treatment system as set forth in claim 1, wherein the first set of exhaust after-treatment components comprises one or more first set components, each of which first set components function optimally at below 200° C.

7. The exhaust after-treatment system as set forth in claim 6, wherein the second set of exhaust after-treatment components comprises one or more second set components, each of which second set components function optimally at above 200° C.

8. A method for operating an exhaust after-treatment system, the exhaust after-treatment system comprising a first set of exhaust after-treatment components, a second set of exhaust after-treatment components, the first set of exhaust after-treatment components comprising different types of exhaust after-treatment components than the second set of exhaust after-treatment components, an inlet to the exhaust after-treatment system, an outlet from the exhaust after-treatment system, and a valve and conduit arrangement configurable in a plurality of modes, comprising:
- configuring the valve and conduit arrangement in a first mode such that exhaust gas entering the inlet flows through the second set of exhaust after-treatment components, then through the first set of exhaust after-treatment components, and then through the outlet,
- configuring the valve and conduit arrangement in a second mode such that exhaust gas entering the inlet flows through the second set of exhaust after-treatment components without flowing through the first set of exhaust after-treatment components, and then through the outlet, and
- configuring the valve and conduit arrangement in a third mode wherein exhaust gas entering the inlet flows through the first set of exhaust after-treatment components, then through the second set of exhaust after-treatment components, and then through the outlet, wherein the exhaust after-treatment system comprises at least one sensor for detecting at least one operating condition, and a controller configured to receive a signal from the at least one sensor corresponding to the at least one operating condition, the method comprising
- automatically configuring, via the controller, the valve and conduit arrangement in the first mode when the at least one operating condition is in a first condition including that a temperature measured at the inlet is below a predetermined temperature, and
- automatically configuring, via the controller, the valve and conduit arrangement in the second mode when the at least one operating condition is in a second condition including that the temperature measured at the inlet is above the predetermined temperature.

9. The method as set forth in claim 8, comprising automatically configuring, via the controller, the valve and conduit arrangement in the third mode when the at least one operating condition is in a third condition.

10. The method as set forth in claim 9, wherein the third condition is that regeneration of at least one component of the first set of components is required.

* * * * *